Reissued Feb. 23, 1954

Re. 23,789

UNITED STATES PATENT OFFICE 23,789

MIXED BORIDES

Harold R. Montgomery, Niagara Falls, Ontario, Canada, assignor to Norton Company, Worcester, Mass., a corporation of Massachusetts No Drawing. Original No. 2,613,154, dated October 7, 1952, Serial No. 162,800, May 18, 1950. Application for reissue December 4, 1953, Serial No. 396,362

12 Claims. (Cl. 106—43)

Matter enclosed in heavy brackets [ ] appears in the original patent but forms no part of this reissue specification; matter printed in italics indicates the additions made by reissue.

This invention relates to a composition of matter consisting of a mixture of carbon boride and metal boride in certain proportions and to a method of producing the composition. This application is a continuation in part of my copending application Ser. No. 49,859, filed September 17, 1948, now abandoned.

One object of the invention is to produce a very hard material, having a hardness exceeding 9 on Mohs' scale, and which also has high tensile strength for material of its class. Another object of the invention is to produce a hot molded body of very fine crystal structure, since such fine crystal structure is especially desired in a number of products such as dies, gauge tips, gauge blocks, mortars and other products. Another object is to provide a composition which can be synthesized from readily available materials of comparatively low cost. Another object is to produce a composition as hard as boron carbide, as easily moldable and yet having some superior properties such as increased tensile strength (up to twice that of boron carbide) and of fine crystal structure. Another object is to produce a composition which has great resistance to wear and which will take a high polish.

Another object of the invention is to provide a superior method of obtaining a homogeneous mixture of carbon boride and metal boride. Another object is to provide a simple and readily controlled process for making many pieces of identical composition.

Another object of the invention is to produce articles of great hardness and comparatively high tensile strength. Another object is to produce articles for various uses, such as for dies of various kinds, gauge tips, gauge blocks, mortars and sandblast nozzles and the like which have superior wearing qualities. Another object is to make pieces which can be used for truing grinding wheels.

Other objects will be in part obvious or in part pointed out hereinafter.

I can use any metal selected from the group consisting of titanium, vanadium, chromium, zirconium, columbium, molybdenum, hafnium, tantalum and tungsten (wolfram). As an example I will describe the synthesis involving titanium.

I provide a quantity of titanium powder. This is now readily available on the market so I do not have to describe how the ore is reduced to make this metal powder. The grit size of the commercially available powder is of the order of 200 mesh and a typical analysis is as follows:

TABLE I

TITANIUM METAL POWDER

Analysis on a dry basis, by weight:

| | Per cent |
|---|---|
| Titanium, Ti | 99.0 |
| Carbon, C | 0.16 |
| Iron, Fe | 0.04 |
| Silicon, Si | 0.08 |
| Zirconium, Zr | 0.09 |
| Hydrogen, H | trace |
| Titanium suboxides | trace |

This powder comes mixed with about 15% of water since dry titanium powder explodes with a hot flame when exposed to the air.

I further provide a quantity of boron-rich boron carbide in powder form. This is a solid solution of boron in boron carbide and may be produced as follows: Boron carbide, $B_4C$ which is equally truly carbon boride or boride of carbon may be produced in accordance with the synthesis of U. S. Patent No. 1,897,214 using the furnace described in U. S. Patent No. 2,123,153, both being on inventions of R. R. Ridgway. Tons of such carbon boride are now annually produced by a certain manufacturer and have been for a number of years. The pigs so produced in accordance with the above patents do not turn out to be pure $B_4C$ but rather each one contains a quantity of substantially $B_4C$ material plus a quantity of carbon-rich boron carbide and/or a quantity of boron-rich boron carbide.

In practice selected samples of each pig are analyzed and then the purer $B_4C$ material is selected by hand sorting since it has a comparatively dull appearance that makes it fairly easy to pick out. The remainder has heretofore been mixed together and sold for such uses as lapping compound and metallurgical additions but there is a surplus of this material (carbon-rich and boron-rich boron carbide). It is thus, to a certain extent, a by-product material.

On the basis of the analyses of the pigs, which as aforesaid are regularly made, I can readily select those having, besides the high grade boron carbide $B_4C$, a remainder which is mostly boron-rich boron carbide. This material is selected and analyzed and by selecting a considerable number of lots I have on hand boron-rich boron carbide of various proportions of boron. From these lots it is now possible to make a mixture of powders having any proportion of boron within the limits of the sample having the most boron on the one hand and pure $B_4C$ on the other hand. Pure $B_4C$ analyzes as follows:

TABLE II

Theoretical analysis of $B_4C$ by weight:

| | Per cent |
|---|---|
| Boron | 78.3 |
| Carbon | 21.7 |
| | 100.0 |

Over a number of years, in the manufacture of boron carbide $B_4C$, trying always to make as much of the pure $B_4C$ material as possible, the boron-rich boron carbide having the most boron analyzed about as follows:

TABLE III

Analysis of boron-rich boron carbide produced in attempt to make $B_4C$, having the most boron by weight:

| | Per cent |
|---|---|
| Boron | 83.0 |
| Carbon | 15.5 |
| Unidentified but probably mostly oxygen | 1.5 |
| | 100.0 |

It is thus seen that, proceeding in the manner indicated, I can have an amount of boron between 78.3% and about 84.2% (based on the total boron and carbon present and excluding impurities). But I can also make a boron-rich boron carbide according to U. S. Patent No. 2,141,617 to the same R. R. Ridgway and this has been made having as much as 88% of boron. Using this latter material and mixing it with the theoretical proportion of titanium, to react all the boron I can produce a mixed boride as follows:

TABLE IV

TITANIUM BORIDE—CARBON BORIDE MATERIAL

| | By Volume | By Weight |
|---|---|---|
| | | Percent |
| $TiB_2$ | 60 | 72 |
| $CB_4$ | 40 | 28 |

However, to obtain the desired physical properties I want to limit the $TiB_2$ to 50% by volume, and thus the upper limit according to my invention is 50% 50% by volume $TiB_2$ and $CB_4$ (disregarding other material for the moment).

At the other extreme, my novel composition should have at least 10% titanium boride, $TiB_2$ by volume, which is 16.7% by weight in order to have the desired qualities to some degree. The best material that I have made so far has analyzed:

TABLE V

Analysis of best mixed boride so far made, by weight:

| | Per cent |
|---|---|
| $TiB_2$ | 23.2 |
| $CB_4$ | 66.5 |
| Excess boron | 7.6 |
| Fe | 0.16 |
| Undetermined, mostly oxygen | 2.54 |
| | 100.00 |

| | Per cent |
|---|---|
| B | 66.83 |
| C | 14.47 |
| Ti | 15.94 |
| Fe | 0.16 |
| Undetermined, mostly oxygen | 2.60 |
| | 100.00 |

As a practical matter I prefer the material which is between 10% and 50% by volume $TiB_2$ which is between 16.7% and 64% by weight of $TiB_2$.

EXAMPLE I

As a typical example of the production of this mixed boride of titanium and carbon and specifically for the manufacture of the boride of Table V, I used a boron-rich boron carbide analyzing as follows:

TABLE VI

Analysis of a specific lot of boron-rich boron carbide, by weight:

| | Per cent |
|---|---|
| Boron | 81.71 |
| Carbon | 17.54 |
| Fe | 0.39 |
| Remainder undetermined | 0.36 |
| | 100.00 |

This had been crushed and ball milled to a particle size as follows:

TABLE VII

Particle size of material of Table VI, by weight:

| | Per cent |
|---|---|
| Smaller than 1 micron | 4 |
| 1 to 2 microns | 7 |
| 2 to 3 microns | 14 |
| 3 to 5 microns | 24 |
| 5 to 8 microns | 45 |
| 8 to 11 microns | 6 |
| | 100 |

I also used titanium powder of the kind above identified. See Table I.

Taking 951 grams of the boron-rich boron carbide of Table VI and VII and 351 grams of wet titanium powder of Table I containing 15% of water, I put it into a muller mixer and mixed the material for one hour. A muller mixer has a pan rotating on a vertical axis and in the pan is a pair of wheels together with plows to stir the material and this type of mixer does a good job of mixing. A thorough mixing of the particles is important for the attainment of maximum strength of the pieces.

The material so mixed was then placed in a graphite mold having 22 mold bores each one half an inch in diameter, and each bore being equipped with two graphite mold plungers, all as illustrated and described in U. S. Patent No. 2,150,884 to R. R. Ridgway and B. L. Bailey. The mold so charged was then placed in the furnace of U. S. Patent No. 2,125,588 to R. R. Ridgway and the material was molded at a temperature of 2200° C. for half an hour with a pressure of 2500 pounds per square inch. After cooling the mold was removed from the furnace and broken away from the 22 pieces which were found to have average cross-bending strength of 75,000 pounds to the square inch. They had approximately the same hardness as molded boron carbide, but the cross-bending strength was much greater than that of molded boron carbide which seldom exceeds 40,000 pounds to the square inch.

The above can be varied in many details, and any furnace which will reach the desired temperature and is equipped with pressure apparatus can be used. The minimum temperature useable in any case is about 1900° C. but actually the mold plungers move when the process is about completed and it is then that the power (for heating) should be turned off. The pressure can be varied, but the graphite molds will not stand pressures very much higher than 2500 pounds per square inch and 1000 pounds per square inch is the minimum for good pieces. The pressure is mechanical pressure and I do not know of any upper limit provided the mold will stand it.

EXAMPLE II

In another run I used a boron-rich boron carbide as follows:

TABLE VIII

Analysis of a specific lot of boron-rich boron carbide, by weight:

| | Per cent |
|---|---|
| Boron | 82.00 |
| Carbon | 17.31 |
| Fe | 0.32 |
| Total | 99.63 |

One thousand and twenty grams of this boron-rich boron carbide was mixed with two hundred six grams of the titanium metal powder of Table I (dry weight but the powder of course was wet) and then this mixture was processed as described in Example I. The resulting pieces of titanium boride-carbon boride analyzed as follows:

TABLE IX

Analysis of mixed boride, by weight:

| | Per cent |
|---|---|
| $TiB_2$ | 16.8 |
| $CB_4$ | 72.0 |
| Excess boron | 10.5 |
| Fe | 0.6 |
| Undetermined, mostly oxygen | 0.1 |
| | 100.0 |

| | Per cent |
|---|---|
| B | 72.14 |
| C | 15.64 |
| Ti | 11.59 |
| Fe | 0.60 |
| Undetermined, mostly oxygen | 0.03 |
| | 100.00 |

EXAMPLE III

In another run I used a boron-rich boron carbide as follows:

TABLE X

Analysis of a specific lot of boron-rich boron carbide, by weight:

| | Per cent |
|---|---|
| Boron | 81.71 |
| Carbon | 17.54 |
| Fe | 0.39 |
| Total | 99.64 |

One thousand grams of this boron-rich boron carbide was mixed with six hundred grams of the titanium powder of Table I (dry weight but the powder of course was wet) and then this mixture was processed as described in Example I.

The resulting pieces of titanium boride-carbon boride analyzed as follows:

TABLE XI

Analysis of mixed boride, by weight:

| | Per cent |
|---|---|
| $TiB_2$ | 48.1 |
| $CB_4$ | 50.3 |
| Excess boron | nil |
| Undetermined, mostly Fe and oxygen | 1.6 |
| | 100.0 |

| | Per cent |
|---|---|
| B | 54.3 |
| Ti | 33.1 |
| C | 11.0 |
| Undetermined, mostly Fe and oxygen | 1.6 |
| | 100.0 |

EXAMPLE IV

In another run I used the same boron-rich boron carbide as in Example II, see Table VIII.

Eleven hundred five grams of this boron-rich boron carbide was mixed with four hundred ninety five grams of the titanium metal powder of Table I (dry weight but the powder of course was wet) and then this mixture was processed as described in Example I. The resulting pieces of titanium boride-carbon boride analyzed as follows:

TABLE XII

Analysis of mixed boride, by weight:

| | Per cent |
|---|---|
| $TiB_2$ | 35.9 |
| $CB_4$ | 58.3 |
| Excess boron | 4.1 |
| Fe | 0.4 |
| Undetermined, mostly oxygen | 1.3 |
| | 100.0 |

| | Per cent |
|---|---|
| B | 60.94 |
| Ti | 24.70 |
| C | 12.63 |
| Fe | 0.38 |
| Undetermined, mostly oxygen | 1.30 |
| | 100.00 |

EXAMPLE V

In another run I selected two lots of boron-rich boron carbide identified as A and B as follows:

TABLE XIII

Analysis of lots A and B of boron-rich boron carbide, by weight:

| | A | B |
|---|---|---|
| | Percent | Percent |
| Boron | 86.07 | 77.89 |
| Carbon | 11.84 | 21.62 |
| Fe | 0.08 | 0.02 |
| Total | 97.99 | 99.53 |

Lots A and B were blended in the proportion of 4 part of A to 6 part of B and 1000 grams of the mixture thereof was mixed with 525 grams of the above identified titanium powder (dry weight but the powder of course was wet) and then this mixture was processed as described in Example I. The resulting pieces of titanium boride-carbon boride analyzed as follows:

TABLE XIV

Analysis of mixed boride, by weight:

| | Per cent |
|---|---|
| $TiB_2$ | 43.3 |
| $CB_4$ | 52.5 |
| Excess carbon | 1.7 |
| Fe | 0.2 |
| Undetermined, mostly oxygen | 2.3 |
| | 100.0 |

| | Per cent |
|---|---|
| B | 55.44 |
| C | 12.17 |
| Ti | 29.82 |
| Fe | 0.24 |
| Undetermined, mostly oxygen | 2.33 |
| | 100.00 |

The particle sizes of the boron-rich boron carbide powders used in Examples II to V inclusive were of the same order as the sizes of the particles given in the case of Example I. The rods of the mixed boride had cross-bending strength in pounds per square inch as in the following table.

TABLE XV

| Pieces Made According to Example | Cross-Bending Strength in Pounds per Square Inch |
|---|---|
| II | 59,500 |
| III | 62,700 |
| IV | 76,700 |
| V | 68,800 |

When using any of the other metals listed herein I aim to produce the same range of percentages by volume, to wit from 10% to 50% of the metal boride by volume in the combination of metal boride and carbon boride in which the carbon boride is substantially all of the remainder. I can use boron-rich boron carbide such as identified in Table III or in Table VI. Borides of the elements Ti, V, Cr, Zr, Cb, Mo, Hf, Ta and W which have been identified and which can be made in this reaction include: $TiB_2$, $VB_2$, $CrB_2$, $ZrB_2$, $CbB_2$, $Mo_2B_5$, $HfB_2$, $TaB_2$, $W_2B_5$. Any of these borides can be synthesized from boron-rich boron carbide by adding to the boron-rich boron carbide an amount of the metal to produce the known metal boride leaving little or no excess metal and using all or nearly all of the excess boron over the formula $B_4C$ in the boron-rich boron carbide, and the resulting product is substantially a mixture of carbon boride $CB_4$ and boride of the metal.

There are other known borides of these elements, for example CrB, MoB, $Mo_2B$, WB and $W_2B$, but I believe they are not formed in my synthesis because the metals have such an affinity for boron that they take as much of it as is not combined in $B_4C$ and will also take boron from the compound $B_4C$ leaving excess carbon which, however, does not usually appear as graphite but may exist in solution.

Thus to make any one of these mixed borides with from 10% to 50% by volume of metal boride I make specific gravity calculations and select a boron-rich boron carbide having enough excess boron which when combined with sufficient metal to make the boride of this metal will give me the volume percent desired. For example if it be decided to make a mixed carbon boride-molybdenum boride with 30% by volume of molybdenum boride, I first take the respective specific gravities of molybdenum boride $Mo_2B_5$ and carbon boride $CB_4$ and from these I can calculate the weight percentages of each which will give volume percentages of 30–70 respectively. The weight percentages now being known, I can calculate the amount of molybdenum and the amount of boron to make the $Mo_2B_5$ in 100 grams of the combination. From the foregoing it can readily be determined how much percentage of excess boron there should be in the boron-rich boron carbide to be used. Then by methods already pointed out I make up a mixture of boron-rich boron carbide having just this percentage of excess boron. The rest is merely a matter of adding the calculated amount of molybdenum, doing a thorough job of mixing, charging into the graphite mold and molding in the Ridgway pressure furnace of Patent No. 2,125,588 as already described in Example I.

But as already pointed out, every one of the nine metals listed herein has such a strong affinity for boron that it will rob boron carbide $B_4C$ of some of the boron which of course leaves an excess of carbon, but this carbon does not appear as graphite if it is no more than [2%] 3.2% by weight on the total $B_4C+C$. So therefore, since useful molded products can be made of mixed borides of any of the metals herein and carbon, with not more than [2%] 3.2% of excess carbon by weight on the total excess carbon and $B_4C$, I can make these other products having excess carbon. Excess boron will never appear if there is sufficient metal to unit with it [and I prefer that sufficient metal be provided to take up all the boron beyond $B_4C$. However 5% by weight excess boron can be tolerated and still not greatly diminish the strength of the product].

Any two or more of the metals listed can be used in the process with boron carbide $B_4C$ with or without excess boron to produce complexes of carbon boride and metal borides and in any case the total metal boride should be between 10% and 50% by volume of the product. All of the metal borides of the nine metals herein are compatible with each other. In some cases ternary or quaternary boron compounds may result and in other cases mere mixtures of borides. Calculations for the manufacture of pieces using more than one metal involve first deciding the respective volume percentages of all of the borides, converting these to weight percentages, figuring out the total excess boron wanted, making up a mixture having such excess boron, then making a mixture of the metals by weight to provide the required amount by weight of each metal.

In order to make any of the above calculations, no matter how complex, the only information besides that already given and the atomic weights which will be found in any chemical handbook, is the specific gravities of the various borides involved. These are as follows:

TABLE XVI

| Boride | Specific Gravity Compared to Water or Density in Grams per c.c. |
|---|---|
| Titanium Boride, $TiB_2$ | 4.50 |
| Vanadium Boride, $VB_2$ | 5.10 |
| Chromium Boride, $CrB_2$ | 5.15 |
| Zirconium Boride, $ZrB_2$ | 6.08 |
| Columbium Boride, $CbB_2$ | 6.97 |
| Molybdenum Boride, $Mo_2B_5$ | 7.12 |
| Hafnium Boride, $HfB_2$ exists in material reported as $ZrB_2$ | ------ |
| Tantalum Boride, $TaB_2$ | 12.38 |
| Tungsten Boride, $W_2B_5$ | 12.75 |

The relation of the metals selected to one another will readily be seen from the following table.

TABLE XVII

| Metal | Atomic Number | Group |
|---|---|---|
| Titanium, Ti | 22 | IV |
| Vanadium, V | 23 | V |
| Chromium, Cr | 24 | VI |
| Zirconium, Zr | 40 | IV |
| Columbium, Cb | 41 | V |
| Molybdenum, Mo | 42 | VI |
| Hafnium, Hf | 72 | IV |
| Tantalum, Ta | 73 | V |
| Tungsten (Wolfram) W | 74 | VI |

The nine different metal borides and also carbon boride are all non-valence compounds, but all give distinct X-ray patterns.

Various metal powders other than titanium powder which are available and I can use are as follows:

TABLE XVIII

Analysis on a dry basis, by weight:

TUNGSTEN METAL POWDER

| | |
|---|---|
| Tungsten, W | 99.32 |
| Carbon, C | 0.26 |
| Not determined | .42 |
| | 100.00 |

CHROMIUM METAL POWDER

| | |
|---|---|
| Chromium, Cr | 98.78 |
| Carbon, C | 0.04 |
| Iron, Fe | 0.28 |
| Nickel, Ni | 0.63 |
| Not determined | 0.27 |
| | 100.00 |

VANADIUM METAL POWDER

| | Purer Grade | Also Usable Grade |
|---|---|---|
| Vanadium, V | 95.18 | 91.45. |
| Aluminum, Al | 1.00 | 1.00. |
| Silicon, Si | 0.27 | 0.90. |
| Iron, Fe | 0.35 | 2.05. |
| Carbon, C | 0.40 | 0.10. |
| Sulphur, S | 0.005 | 0.08. |
| Phosphorus, P | nil | 0.02. |
| Manganese, Mn | 0.01 | 0.04. |
| Oxygen | Balance chiefly | Balance chiefly. |

ZIRCONIUM METAL POWDER

| | |
|---|---|
| Zirconium, Zr | 99.5 |
| Remainder undetermined | |

In the above, the material reported as zirconium is probably actually a mixture of zirconium and hafnium in undetermined proportions, but mostly zirconium.

The foregoing Table XVIII is given by way of example of the kind of metal powders available and not by way of limitation. Of course, if as and when purer powders are available, I can use them. I can also use metal powders which are impurer but naturally much if not all of the impurity will be found in the final product. The remainder of the metals (except hafnium) to wit, columbium, molybdenum and tantalum are all available in powder form but I do not have analyses thereof. Hafnium is quite similar to zirconium in chemical properties and is usually present in commercial zirconium and compounds thereof and in fact is usually reported as Zr since it is difficult to distinguish it therefrom. Thus the boride formed of "zirconium" powder is probably $xZrB_2+yHfB_2$ and this is within my invention.

In the cases of any of the mixed borides herein mentioned, having available boron-rich boron carbide with 88% by weight or less of boron, I can make the mixed boride containing as much as 50% by volume metal boride, the remainder substantially all carbon boride $B_4C$. Furthermore, in all cases I want as much as 10% by volume of the metal boride. In all the embodiments of the invention therefore, the limits of metal boride are between 10% and 50% by volume and in physical characteristics comparable percentages by volume give comparable results with all the materials where comparable percentages by weight in many cases give different results.

I have made mixed borides according to the invention of the following systems:

$TiB_2+CB_4$
$CrB_2+CB_4$
$ZrB_2+CB_4$ or $xZrB_2+yHfB_2+CB_4$
$Mo_2B_5+CB_4$
$TaB_2+CB_4$
$W_2B_5+CB_4$ and in no case could carbide in excess of 4% by weight be detected by X-ray analysis. While carbon has a strong affinity for many metals including those herein listed, boron appears to have a greater affinity for them. Carbon has a greater affinity for titanium than for iron. I feel able to predict therefore, that in the cases of the following systems:

$VB_2+CB_4$
$CbB_2+CB_4$ there will be no very great percentage of metal carbide formed when the material of the system is made in accordance herewith.

Proceeding as in Example I, I have made tungsten boride-carbon boride pieces according to the following analysis:

TABLE XIX

ANALYSIS OF MIXED BORIDE

| | By Weight | By Volume |
|---|---|---|
| | Percent | Percent |
| $W_2B_5$ | [68.3] *75.6* | [34] *38.2* |
| $CB_4$ | [24.8] *23.3* | [63.5] *59.8* |
| [WC] *C* | [6.5] *0.7* | [2.5] *2.0* |
| Undetermined | *0.4* | |
| | 100.0 | 100.0 |
| B | 28.0 | |
| C | 5.8 | |
| W | 65.8 | |
| Undetermined | 0.4 | |
| | 100.0 | |

Also proceeding as in Example I, I have made molybdenum boride-carbon boride pieces according to the following analysis:

TABLE XX

ANALYSIS OF MIXED BORIDE

| | By Weight | By Volume |
|---|---|---|
| | Percent | Percent |
| $Mo_2B_5$ | 39.0 | 20.2 |
| $CB_4$ | 54.6 | 79.8 |
| Undetermined | 5.9 | |
| Carbon (not assigned) | .5 | |
| | 100.0 | 100.0 |
| Mo | 30.50 | |
| B | 51.24 | |
| C | 12.43 | |
| Fe | Trace | |
| Undetermined | 5.83 | |
| | 100.00 | |

To make good pieces according to my invention the mixed boride should comprise from 10% to 50% by volume of metal boride, the remainder not over 6% by weight of material other than $CB_4$ uncombined boron and carbon in solid solution, with at least 80% by weight of said reminder being carbon boride $CB_4$. The molybdenum boride-carbon boride material of Table XX had less than 6% by weight of material other than molybdenum boride, $CB_4$, uncombined boron and carbon in solid solution.

It will thus be seen that there has been provided, according to this invention, compositions, articles and processes in which the various objects hereinabove set forth together with many thoroughly practical advantages are successfully achieved. As various possible embodiments can be made of the compositions of the above invention and as the art herein described might be varied in various parts, all without departing from the scope of the invention, it is to be understood that all matter hereinbefore set forth is to be interpreted as illustrative and not in a limiting sense.

I claim:

1. Process of making solid articles of carbon boride and metal boride which comprises heating to a temperature of at least 1900° C. under mechanical pressure of at least 1000 pounds to the square inch a mixture of carbon boride and metal selected from the group consisting of titanium, vanadium, chromium, zirconium, columbium, molybdenum, hafnium, tantalum and tungsten and mixtures thereof, the amount of metal being sufficient to synthesize with the boron in the carbon boride at least 10% and being insufficient to synthesize more than 50% by volume of metal boride selected from the group consisting of $TiB_2$, $VB_2$, $CrB_2$, $ZrB_2$ $CbB_2$, $Mo_2B_5$, $HfB_2$, $TaB_2$ and $W_2B_5$ and mixtures thereof, said carbon boride having at least as much boron as is represented by the formula $CB_4$, the amount of boron in the mixture being sufficient and the amount of carbon in the mixture being limited so that over and above the carbon in $CB_4$ and in boride selected from the aforesaid group there will not be present after the synthesis uncombined carbon in excess of [2%] 3.2% by weight of the $CB_4$ and such excess nor metal carbide in excess of 4% by weight of said article.

2. A hard refractory homogeneous article of carbon boride and metal boride comprising from 10% to 50% by volume of metal boride selected from the group consisting of $TiB_2$, $VB_2$, $CrB_2$, $ZrB_2$, $CbB_2$, $Mo_2B_5$, $HfB_2$, $TaB_2$, and $W_2B_5$ and mixtures thereof, the remainder not over 6% by weight of material other than $CB_4$, uncombined boron and carbon in solid solution, with at least 80% by weight of said remainder being carbon boride $CB_4$, said article being free of uncombined carbon over [2%] 3.2% by weight of the $CB_4$ and uncombined carbon and said article being free of metal carbide over 4% by weight of the said article, said article having been formed by the combined action of heat of at least 1900° C. top temperature and mechanical pressure of at least 1000 pounds to the square inch.

3. Process of making solid articles of carbon boride and metal boride which comprises heating to a temperature of at least 1900° C. under mechanical pressure of at least 1000 pounds to the square inch a mixture of carbon boride and zirconium, the amount of zirconium being sufficient to synthesize with the boron in the carbon boride at least 10% and being insufficient to synthesize more than 50% by volume of zirconium boride $ZrB_2$, said carbon boride having at least as much boron as is represented by the formula $CB_4$, the amount of boron in the mixture being sufficient and the amount of carbon in the mixture being limited so that over and above the carbon in $CB_4$ and in zirconium boride $ZrB_2$ there will not be present after the synthesis uncombined carbon in excess of [2%] 3.2% by weight of the $CB_4$ and uncombined carbon and said article being free of metal carbide over 4% by weight of said article, said article having been formed by the combined action of heat of at least 1900° C. top temperature and mechanical pressure of at least 1000 pounds to the square inch.

4. A hard refractory homogeneous article of carbon boride and zirconium boride comprising from 10% to 50% by volume of zirconium boride $ZrB_2$, the remainder not over 6% by weight of material other than $CB_4$, uncombined boron and carbon in solid solution with at least 80% by weight of said remainder being carbon boride $CB_4$, said article being free of uncombined carbon over [2%] 3.2% by weight of the $CB_4$ and uncombined carbon in excess of [2%] 3.2% by of metal carbide over 4% by weight of said article, said article having been formed by the combined action of heat of at least 1900° C. top temperature and mechanical pressure of at least 1000 pounds to the square inch.

5. Process of making solid articles of carbon boride and titanium boride which comprises heating to a temperature of at least 1900° C. under mechanical pressure of at least 1000 pounds to the square inch a mixture of carbon boride and titanium, the amount of titanium being sufficient to synthesize with the boron in the carbon boride at least 10% and being insufficient to synthesize more than 50% by volume of titanium boride $TiB_2$, said carbon boride having at least as much boron as is represented by the formula $CB_4$, the amount of boron in the mixture being sufficient and the amount of carbon in the mixture being limited so that over and above the carbon in $CB_4$ and in titanium boride $TiB_2$ there will not be present after the synthesis uncombined carbon in excess of [2%] 3.2% by weight of the $CB_4$ and such excess nor metal carbide in excess of 4% by weight of the solid article.

6. A hard refractory homogeneous article of carbon boride and titanium boride comprising from 10% to 50% by volume of titanium boride $TiB_2$, the remainder not over 6% by weight of material other than $CB_4$, uncombined boron and carbon in solid solution, with at least 80% by weight of said remainder being carbon boride $CB_4$, said article being free of uncombined carbon over [2%] *3.2%* by weight of the $CB_4$ and uncombined carbon and said article being free of metal carbide over 4% by weight of said article, said article having been formed by the combined action of heat of at least 1900° C. top temperature and mechanical pressure of at least 1000 pounds to the square inch.

7. Process of making solid articles of carbon boride and tantalum boride which comprises heating to a temperature of at least 1900° C. under mechanical pressure of at least 1000 pounds to the square inch a mixture of carbon boride and tantalum, the amount of tantalum being sufficient to synthesize with the boron in the carbon boride at least 10% and being insufficient to synthesize more than 50% by volume of tantalum boride $TaB_2$, said carbon boride having at least as much boron as is represented by the formula $CB_4$, the amount of boron in the mixture being sufficient and the amount of carbon in the mixture being limited so that over and above the carbon in $CB_4$ and in tantalum boride $TaB_2$ there will not be present after the synthesis uncombined carbon in excess of [2%] *3.2%* by weight of the $CB_4$ and such excess nor metal carbide in excess of 4% by weight of the solid article.

8. A hard refractory homogeneous article of carbon boride and tantalum boride comprising from 10% to 50% by volume of tantalum boride $TaB_2$, the remainder not over 6% by weight of material other than $CB_4$, uncombined boron and carbon in solid solution, with at least 80% by weight of said remainder being carbon boride $CB_4$, said article being free of uncombined carbon over [2%] *3.2%* by weight of the $CB_4$ and uncombined carbon and said article being free of metal carbide over 4% by weight of said article, said article having been formed by the combined action of heat of at least 1900° C. top temperature and mechanical pressure of at least 1000 pounds to the square inch.

9. Process of making solid articles of carbon boride and tungsten boride which comprises heating to a temperature of at least 1900° C. under mechanical pressure of at least 1000 pounds to the square inch a mixture of carbon boride and tungsten, the amount of tungsten being sufficient to synthesize with the boron in the carbon boride at least 10% and being insufficient to synthesize more than 50% by volume of tungsten boride $W_2B_5$, said carbon boride having at least as much boron as is represented by the formula $CB_4$, the amount of boron in the mixture being sufficient and the amount of carbon in the mixture being limited so that over and above the carbon in $CB_4$ and in tungsten boride $W_2B_5$ there will not be present after the synthesis uncombined carbon in excess of [2%] *3.2%* by weight of the $CB_4$ and such excess nor metal carbide in excess of 4% by weight of the solid article.

10. A hard refractory homogeneous article of carbon boride and tungsten boride comprising from 10% to 50% by volume of tungsten boride $W_2B_5$, the remainder not over 6% by weight of material other than $CB_4$, uncombined boron and carbon in solid solution, with at least 80% by weight of said remainder being carbon boride $CB_4$, said article being free of uncombined carbon over [2%] *3.2%* by weight of the $CB_4$ and uncombined carbon and said article being free of metal carbide over 4% by weight of said article, said article having been formed by the combined action of heat of at least 1900° C. top temperature and mechanical pressure of at least 1000 pounds to the square inch.

11. Process of making solid articles of carbon boride and molybdenum boride which comprises heating to a temperature of at least 1900° C. under mechanical pressure of at least 1000 pounds to the square inch a mixture of carbon boride and molybdenum, the amount of molybdenum being sufficient to synthesize with the boron in the carbon boride at least 10% and being insufficient to synthesize more than 50% by volume of molybdenum boride $Mo_2B_5$, said carbon boride having at least as much boron as is represented by the formula $CB_4$, the amount of boron in the mixture being sufficient and the amount of carbon in the mixture being limited so that over and above the carbon in $CB_4$ and in molybdenum boride $Mo_2B_5$ there will not be present after the synthesis uncombined carbon in excess of [2%] *3.2%* by weight of the $CB_4$ and such excess nor metal carbide in excess of 4% by weight of the solid article.

12. A hard refractory homogeneous article of carbon boride and molybdenum boride comprising from 10% to 50% by volume of molybdenum boride $Mo_2B_5$, the remainder not over 6% by weight of material other than $CB_4$, uncombined boron and carbon in solid solution, with at least 80% by weight of said remainder being carbon boride $CB_4$, said article being free of uncombined carbon over [2%] *3.2%* by weight of the $CB_4$ and uncombined carbon and said article being free of metal carbide over 4% by weight of said article, said article having been formed by the combined action of heat of at least 1900° C. top temperature and mechanical pressure of at least 1000 pounds to the square inch.

HAROLD R. MONTGOMERY.

References Cited in the file of this patent or the original patent

UNITED STATES PATENTS

| Number | Name | Date |
|---|---|---|
| 1,585,412 | Podszus | May 18, 1926 |
| 1,897,214 | Ridgway | Feb. 14, 1933 |
| 2,109,246 | Boyer et al. | Feb. 22, 1938 |
| 2,148,040 | Schwarzkopf | Feb. 21, 1939 |
| 2,613,154 | Montgomery | Oct. 7, 1952 |

Certificate of Correction

Reissue No. 23,789 February 23, 1954

Harold R. Montgomery

It is hereby certified that error appears in the printed specification of the above numbered patent requiring correction as follows:

Column 6, line 54, for "12.63" read 12.68 ; column 11, lines 27 and 28, for "reminder" read remainder ; column 12, line 47, for "in excess of [2%] *3.2%* by" read and paid article being free ;

and that the said Letters Patent should be read as corrected above.

Signed and sealed this 21st day of December, A. D. 1954.

[SEAL]

ARTHUR W. CROCKER,
*Assistant Commissioner of Patents.*